US012762993B2

(12) United States Patent
Kim

(10) Patent No.: US 12,762,993 B2
(45) Date of Patent: Oct. 13, 2026

(54) DISPLAY DRIVING CHIP

(71) Applicant: LX SEMICON CO., LTD., Daejeon (KR)

(72) Inventor: Young Bok Kim, Daejeon (KR)

(73) Assignee: LX SEMICON CO., LTD., Daejeon (KR)

( * ) Notice: Subject to any disclaimer, the term of this patent is extended or adjusted under 35 U.S.C. 154(b) by 0 days.

(21) Appl. No.: 19/165,946

(22) PCT Filed: Oct. 10, 2023

(86) PCT No.: PCT/KR2023/015529
§ 371 (c)(1),
(2) Date: Sep. 16, 2025

(87) PCT Pub. No.: WO2024/195953
PCT Pub. Date: Sep. 26, 2024

(65) Prior Publication Data
US 2026/0268830 A1 Sep. 10, 2026

(30) Foreign Application Priority Data
Mar. 17, 2023 (KR) ........................ 10-2023-0035083

(51) Int. Cl.
*G09G 3/20* (2006.01)
*H04L 7/04* (2006.01)
*H04L 25/03* (2006.01)

(52) U.S. Cl.
CPC ............. *G09G 3/2096* (2013.01); *H04L 7/04* (2013.01); *H04L 25/03878* (2013.01); *G09G 2310/0291* (2013.01); *G09G 2310/061* (2013.01); *G09G 2320/041* (2013.01); *G09G 2330/04* (2013.01); *G09G 2330/06* (2013.01)

(58) Field of Classification Search
CPC ......... G09G 2310/0291; G09G 3/2096; G09G 2320/041; G09G 2310/061; G09G 2330/04; G09G 2330/06; H04L 25/03878; H04L 7/04
See application file for complete search history.

(56) References Cited

U.S. PATENT DOCUMENTS

| | | | | |
|---|---|---|---|---|
| 10,454,725 | B1 * | 10/2019 | Lee | H04L 25/4917 |
| 11,108,988 | B2 * | 8/2021 | Masuda | H04N 21/4424 |
| 2016/0204749 | A1 | 7/2016 | Li et al. | |
| 2017/0111071 | A1 | 4/2017 | Yoo et al. | |
| 2017/0244371 | A1 | 8/2017 | Turker Melek et al. | |
| 2017/0331476 | A1 | 11/2017 | Cho et al. | |
| 2023/0137651 | A1 | 5/2023 | Gans | |

FOREIGN PATENT DOCUMENTS

| | | | |
|---|---|---|---|
| KR | 10-1519917 | B1 | 5/2015 |
| KR | 10-1630340 | B1 | 6/2016 |
| KR | 10-2017-0044969 | A | 4/2017 |
| KR | 10-2017-0127169 | A | 11/2017 |
| KR | 10-2018-0097779 | A | 8/2018 |
| KR | 10-2018-0115759 | A | 10/2018 |
| KR | 10-2021-0035924 | A | 4/2021 |

* cited by examiner

*Primary Examiner* — Muhammad N Edun
(74) *Attorney, Agent, or Firm* — Birch, Stewart, Kolasch & Birch, LLP

(57) ABSTRACT

The present invention relates to a drive chip for variably generating various types of control signals according to temperature changes so that high-quality image data can be provided to a display device, and an operation method thereof.

10 Claims, 4 Drawing Sheets

DISPLAY DRIVING CHIP

CROSS REFERENCE TO RELATED APPLICATIONS

This application is the National Phase of PCT International Application No. PCT/KR2023/015529, filed on Oct. 10, 2023, which claims priority under 35 U.S.C. 119(a) to Patent Application No. 10-2023-0035083, filed in the Republic of Korea on Mar. 17, 2023, all of which are hereby expressly incorporated by reference into the present application.

TECHNICAL FIELD

The present invention relates to a display driving chip which detects temperature changes to minimize changes in operating characteristics of a display driving chip according to the temperature change so that an operating condition of the driving chip is varied, and an operation method thereof.

BACKGROUND ART

Data transmission is one of important functions of an integrated circuit element. As integrated circuit technology advances, a data transmission speed has also gradually increased. When a signal with a high-frequency band is input to a reception terminal of an integrated circuit, impedance matching between an input signal and an input node of the reception terminal of the integrated circuit is required, and this becomes more necessary as a frequency increases. When impedance matching is not properly performed at the reception terminal, a problem arises that a signal input to the reception terminal of the integrated circuit is finally distorted as a bandwidth is reduced due to signal reflection at an end terminal, and the signal is lost as much as it is distorted.

According to the trend of larger display screens and higher resolutions, the same signal distortion problem also occurs between a timing controller and a display driving chip. This is because a signal path from an output terminal of the driving chip to the display panel becomes longer as the display is enlarged. As a data channel, that is, the signal path, becomes longer, the channel impedance increases, and due to a signal reflection phenomenon at the end terminal caused by a high speed, the distortion or loss of the signal becomes more severe.

FIG. 1 is a block diagram for describing a background of the present invention.

In order to minimize the above-mentioned problem, as shown in FIG. 1, an impedance matching circuit 21 is provided inside a display driving chip 20 to set an optimal impedance value in advance. In addition, appropriate bias values are predetermined and set to recover the signal in an amplifier constituting an equalizer circuit 22 included in the display driving chip 20. For reference, in configurations in FIG. 1, an SER 11 inside a timing controller 10 means an alignment circuit (a serializer), a TX 12 means a data transmission circuit (a transmitter), an EQ 22 inside the display driving chip 20 means an equalizer circuit (an equalizer), a CDR 23 means a clock data recovery circuit (clock data recovery), and a DES 24 means a realignment circuit (a deserializer).

However, as an operating temperature of the display driving chip changes or temperature environment around a substrate on which the driving chip is mounted changes, a value of the impedance having temperature dependency changes, and since current of a metal oxide semiconductor (MOS) transistor inside the driving chip also changes due to the temperature dependency, the characteristics of the equalizer circuit 22 also change. This temperature change causes impedance mismatch and imperfect signal equalization, and thus distortion or loss of an image data signal ultimately occurs. This sequentially leads to deterioration in quality of the image data signal transmitted from the driving chip to the display device, and causes a defect in the display screen.

DISCLOSURE

Technical Problem

A technical problem to be solved by the present invention is to allow setting several controllable operating conditions in a display driving chip so as to prevent changes in operating conditions of the display driving chip according to temperature changes.

Another technical problem to be solved by the present invention is to provide a display device and a method for preventing the deterioration of the image quality of a display device due to changes in operating conditions of a display driving chip according to temperature changes.

Technical Solution

According to one embodiment of the present invention for solving the objects, there is provided a display driving chip including: an impedance matching circuit that matches characteristic impedance of a data channel and input impedance of the display driving chip; an equalizer circuit that reinforces the reliability of input data; a clock data recovery circuit for recovering synchronization with the clock signal; a realignment circuit that converts the input data into serial data; and a temperature control circuit including a continuous time linear equalizer circuit (CTLE) controller for adjusting an equalization condition of an internal amplifier of the equalizer circuit in response to a change in temperature detected by a temperature sensor, a bias controller for adjusting a bias of the amplifier, and an impedance controller for adjusting impedance of the impedance matching circuit.

Advantageous Effects

According to the present invention, despite changes in an ambient temperature surrounding a display driving chip or changes in an operating temperature of the driving chip, there is an effect in that the display driving chip can exhibit constant performance and image data of constant quality can be provided to a display device.

MODES OF THE INVENTION

Before describing the present invention, a brief description of technical terms and abbreviations frequently used in the present invention is provided to help understanding thereof. The technical spirit of the present invention may be easily understood by the description. First, throughout the specification of the present invention, terms such as a chip, an integrated circuit (IC), a circuit or circuit unit, and a unit may be interchangeably used, and may necessarily mean a configuration which is individually packaged or a configuration which is compositely packaged in a hybrid form. It should be noted that the meaning of these terms should be interpreted based on the description of the technical content. Further, 'data' herein means 'image data' transmitted from a timing controller to a display driving chip.

Figure 1:
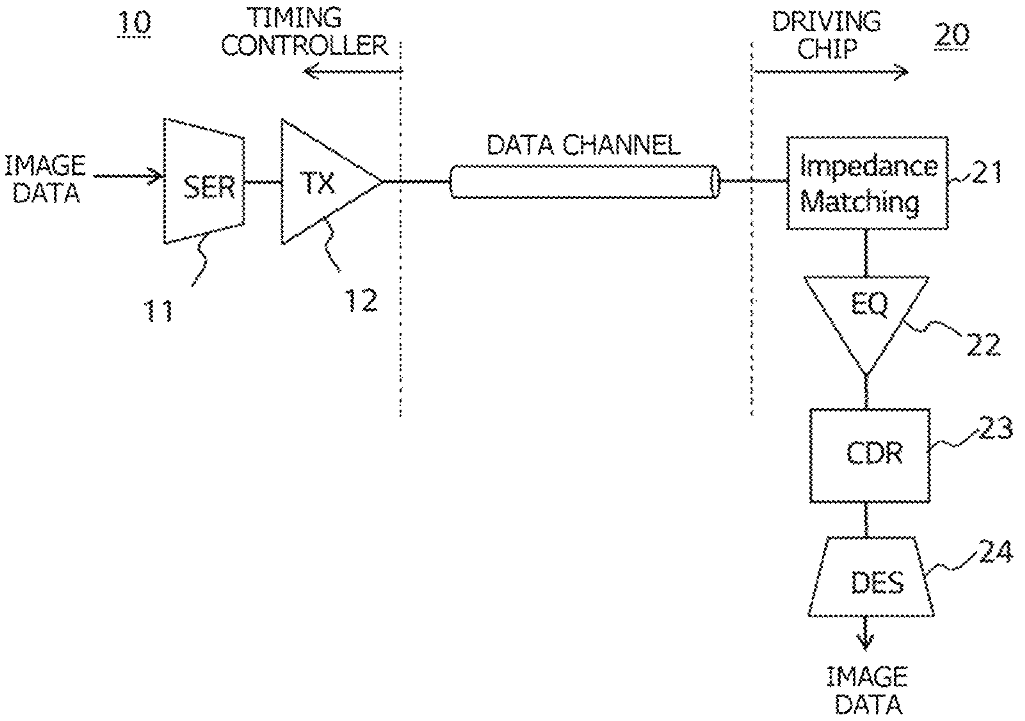
FIG. 1 is a block diagram for describing a background of the present invention.
Figure 2:
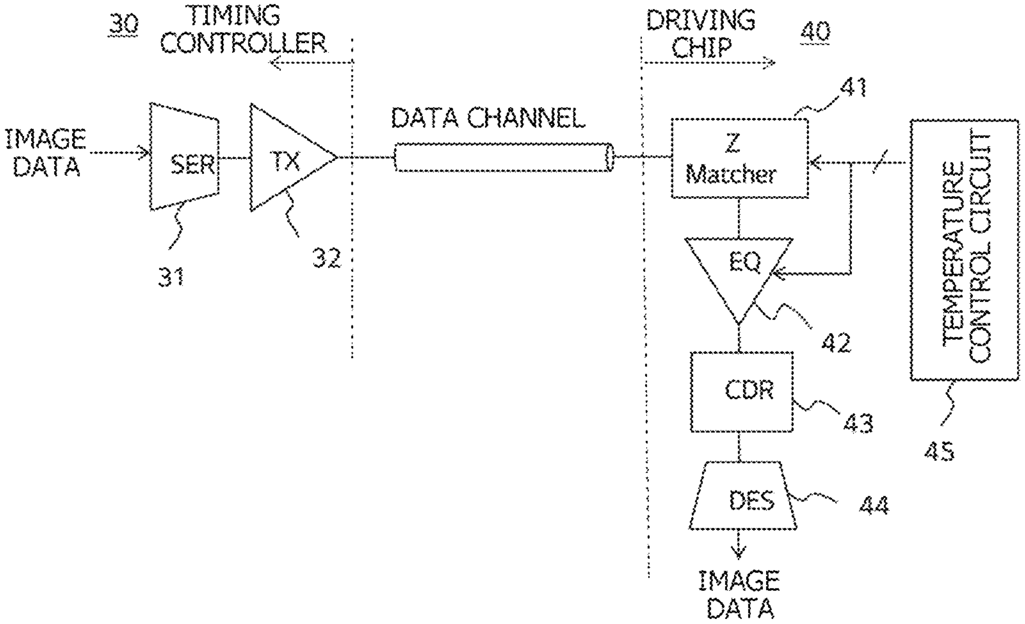
FIG. 2 is a block diagram showing one embodiment of the present invention.

A source driver integrated circuit (SDIC) refers to a semiconductor IC which drives a source direction of a display. In some cases, the SDIC may mean an IC which integrates a read out function of detecting a touch signal and transmitting the touch signal to a touch IC in addition to a source driving function. Hereinafter, the present invention is described using the SDIC as an example, but it is apparent that any driving chip which transmits image data to the display may be applied. As shown in FIG. 2, a timing controller 30 also called as a T-CON refers to a semiconductor chip or circuit, and refers to a configuration which controls transmission of data and data transmission timing so that a display driving chip 40 may appropriately receive display data. An SER 31 inside the timing controller 30 indicates a serializer circuit having a function of sorting data to be output in serial, and a TX 32 means a transmitter forming a final terminal for outputting data outside the timing controller 30.

Hereinafter, a basic configuration of the present invention will be described.

FIG. 2 is a block diagram showing one embodiment of the present invention.

Referring to FIG. 2, in the configuration inside the display driving chip 40 of the present invention, an impedance matching circuit 41 is indicated as a Z-Matcher. The impedance matching circuit 41 matches characteristic impedance of a data channel and impedance of an input terminal of the display driving chip 40, for example, passive elements such as resistors and capacitors are used alone or in combination. In the following description, the impedance matching circuit 41 may be simply expressed as a resistor or variable resistor, but this is only for the convenience of description and may be composed of a combination of various passive elements.

An equalizer circuit (an equalizer, 42) is a circuit for reinforcing the reliability of the signal reduced due to external interference factors such as various parasitic components, noise, or the like while the data transmitted from the timing controller 30 passes through the data channel. As a measure of the reliability or integrity of the signal, a jitter component of a data signal waveform, a degree of eye opening (an opening ratio) which may be measured in accumulation of the signal, and an overshoot or undershoot related to a gain of an amplifier included inside the equalizer circuit 42 may be also included.

A clock data recovery circuit (a clock data recovery, 43) is a circuit required to recover synchronization with the clock signal as the synchronization with the clock signal is reduced while the data output from the timing controller 30 passes through the data channel. Specially, the clock data recovery circuit 43 functions to synchronize or adapt data to the clock signal inside the display driving chip 40 which is gradually faster.

A realignment circuit (deserializer, 44) is a circuit which converts data processed as parallel data in the display driving chip 40 back into serial data and transmits the data to the display panel. This is because the display device receives serial data for each channel and scans the data onto the screen.

A temperature control circuit 45 is a circuit which does not control a temperature itself, but generates an appropriate control signal according to a temperature change.

When the display driving chip starts operating, an operating environment may change. The changing environment may be caused by, for example, temperature dependency of the current of the transistor due to heat generation by a circuit operation. Further, the changing environment may also be a temperature change of the substrate caused by the operation of other components around the display driving chip in addition to the display driving chip. In addition, the changing environment may also be deterioration of the characteristics of the data signal transmitted from the timing controller due to the temperature change. The deterioration may also be a change in the well-known eye opening characteristics. Hereinafter, a method of the present invention is presented to minimize the deterioration of the quality of the transmitted data due to these changes.

Figure 3:
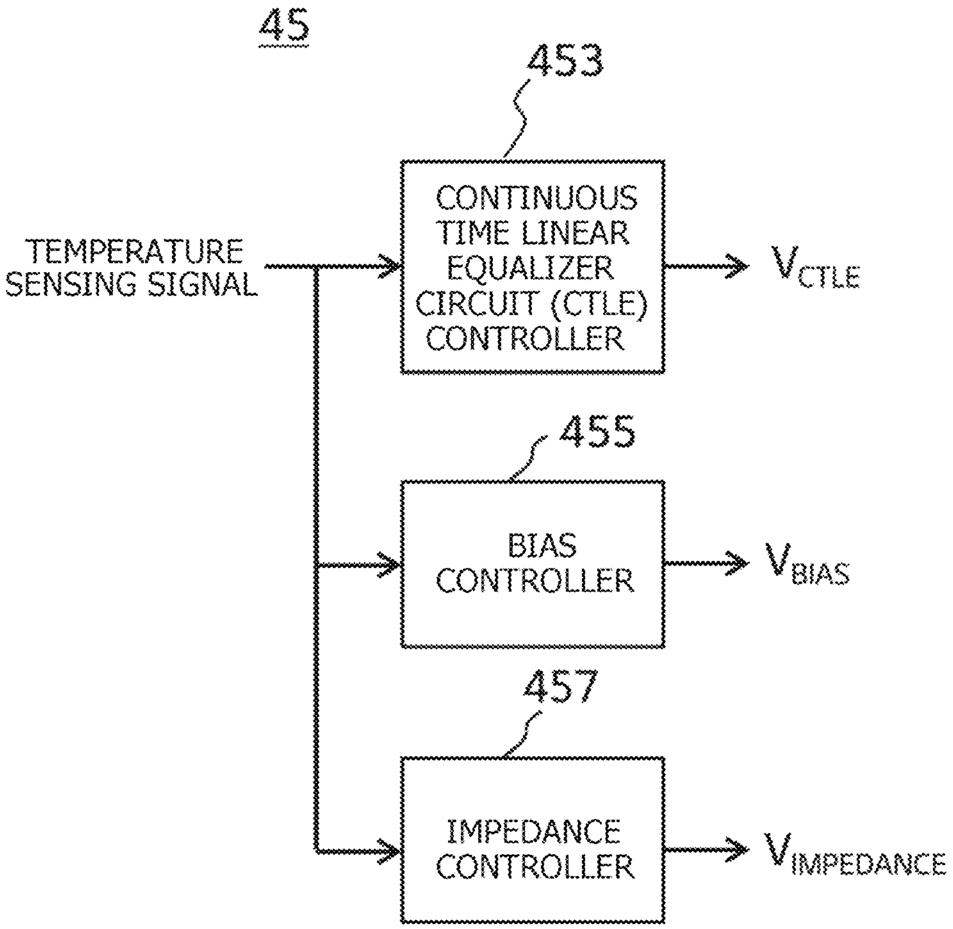
FIG. 3 shows a temperature control circuit of the present invention.

FIG. 3 shows a temperature control circuit of the present invention.

Referring to FIG. 3, the temperature control circuit 45 generates different control signals according to a temperature sensing signal which detects a temperature of the chip itself or a temperature around the chip. The temperature sensing signal may be provided from a temperature sensor provided inside or outside the display driving chip. Specifically, the control signal may be $V_{CTLE}$ for controlling the amplifier inside the equalizer circuit 42, VBIAS for controlling a bias of the equalizer circuit, $V_{IMPEDANCE}$ for controlling the impedance matching circuit, or the like. In order to generate the control signals, the temperature control circuit 45 includes a CTLE controller 453, a bias controller 455, and an impedance controller 457.

Meanwhile, semiconductor chips for commercial use are generally assumed to operate between 0 and 70° C. and various specifications are set accordingly. In the present invention, for example, in order to change each control signal according to the temperature change, the control signals may be set to change at every 10° C. interval from −15° C. to 85° C. based on a reference temperature of 25° C. and with a little margin. The control signals may be changed continuous or separately in response to the temperature change.

Hereinafter, the operation of each of the control signals and the circuits controlled by the control signals according to the temperature change will be described.

Figure 4:
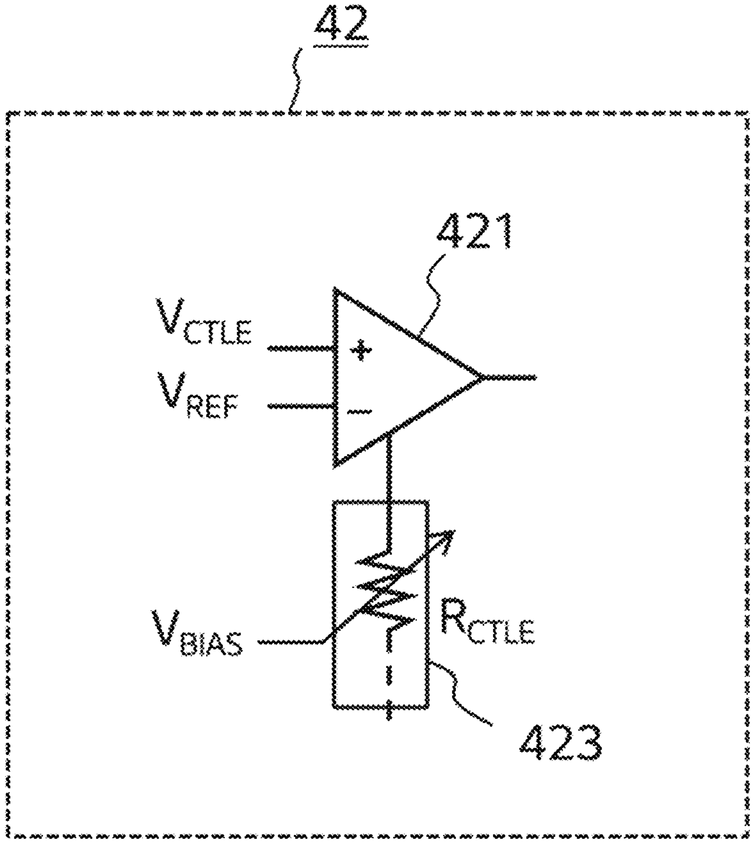
FIG. 4 shows a portion of an equalizer circuit of the present invention.

FIG. 4 shows a portion of the equalizer circuit of the present invention.

Referring to FIG. 4, the equalizer circuit 42 includes an internal amplifier 421 and a bias circuit 423 of the amplifier.

It is preferable that the amplifier 421 uses a continuous time linear equalizer circuit (a continuous time linear equalizer, CTLE) to effectively track input data in real time. The amplifier 421 may not only perform a simple amplification function, but also function as a comparator which compares two input voltages and outputs an output proportional to a difference value. VREF which is one of the two input voltages is a reference voltage, and a voltage generated regardless of the change in the temperature such as a band gap reference (BGR) circuit can be used. $V_{CTLE}$ which is the other of the two input voltages is a control signal provided from the CTLE controller 453, and the characteristics of the amplifier 421 constituting the equalizer circuit 42 change in response to the temperature sensing signal.

As an example of a specific change, the CTLE controller 453 may increase the $V_{CTLE}$ voltage by 10 mV each time the operating temperature increases by 10° C. from −15° C. A voltage difference between two terminals of the amplifier 421 increases due to the increased $V_{CTLE}$ voltage, and thus a voltage gain of the amplifier increases. Accordingly, the quality deterioration of the signal formed during the equalizing operation, such as the degree of distortion of an eye pattern is improved, and thus optimal equalization may be performed.

It should be noted that the above-mentioned specific numbers are adopted only for the convenience of description. An example of a separate change according to the temperature change is also provided for the convenience of description, and it is apparent that an example of a continuous change may be easily inferred from the example of the separate change, and this fact is the same in all descriptions below.

A bias control voltage VBIAS generated by the bias controller 455 constituting of the temperature control circuit 45 variably adjusts a value of the bias to offset a change in characteristics of the amplifier 421 according to the temperature change. For example, the bias controller 455 may increase the bias control voltage VBIAS by 10 mV each time the operating temperature detected by the temperature sensing signal increases by 10° C. from −15° C. The increased voltage may increase or decrease the variable resistance 423. The voltage gain of the amplifier may be increased or decreased by the changed resistance value. Accordingly, automatic equalization performed in a section between each frame data may be performed under an optimal condition. Whether the variable resistance increases or decreases according to an increase in the bias control voltage may change depending on whether an inherent temperature coefficient of the resistance is negative or positive (− or +). In FIG. 4, the bias circuit 423 is simply represented as the variable resistance RCTLE for convenience of description, but may actually be a combination of various passive elements.

The equalizer circuit 42 may have a function of automatically performing initial equalization first in a non-driven state when the display driving chip is initialized by applying a power voltage (power on) or a power on reset (POR) signal to the display driving chip. The initial equalization is a part of a process of preparing for a normal operation when various circuits inside the display driving chip are in the non-driven state. An example of the process may be provided for loop lock in a delayed lock loop (DLL) circuit to ensure the accuracy of the clock signals supplied to the various circuits. Another example may help to set up a steady state charge in a position where a charge sharing operation is required. Since the display driving chip operates at a high speed, the initial equalization is not a single equalization step and is formed of several appropriately selected equalization steps.

Figure 5:
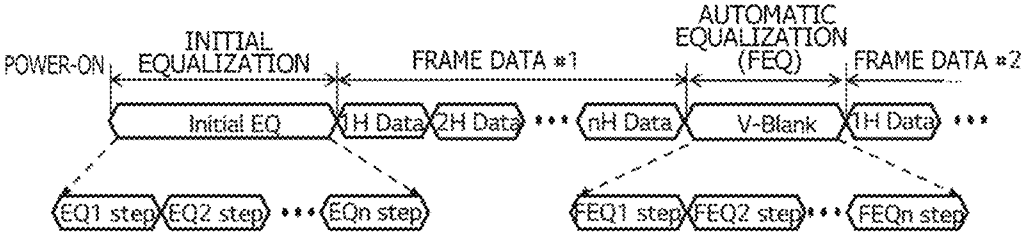
FIG. 5 shows an embodiment of an equalizing operation of the present invention.

FIG. 5 shows an example of the equalizing operation of the present invention.

Referring to FIG. 5, it can be seen that an initial equalization section (an initial EQ) and specific equalization steps EQ included in the initial equalization are an EQ1 step to an EQn step. It is preferable that the initial equalization is performed automatically and appropriately not only when the display driving chip is initialized, but also between sections in which valid image data is processed. For example, since the image data has a relatively large amount of either high or low among binary signals, imbalance of a charge or voltage occurring in internal nodes of some circuits may be resolved. The fact that a condition of the initial equalization is automatically performed between each frame data section is indicated as ‘automatic equalization FEQ’ in FIG. 5. Naturally, the first set automatic equalization FEQ may include all steps (the EQ1 step to the EQn step) of the initial equalization. For the convenience of description, in order to distinguish the steps of the equalization included in the automatic equalization, the steps of the equalization are indicated as an FEQ1 step to an FEQn step. The number or order of these equalization steps is shown as the EQ1 step to the EQn step, or the like, and the number of equalization steps refers to the number of repetitions of the equalizing operation.

One equalization step refers to one equalizing operation performed in a time interval occupied by one clock or one bit of binary, and the equalizing operation may include the circuit operation of the amplifier 421 in the equalizer circuit 42 utilized to clearly distinguish binary information from a distorted waveform, or the circuit operation of pre-emptively charging and sharing voltages of nodes which should be charged to high or discharged to low in the future to an intermediate value between high and low. Further, the equalizing operation using the amplifier 421 may also be utilized to appropriately adjust the gain to minimize waveform distortion due to the jitter so that an output waveform of the amplifier is not excessively overshot or undershot or to control the degree of eye opening (the opening ratio) so that the degree of eye opening is enlarged.

It is preferable that the automatic equalization FEQ is performed under the optimal condition (hereinafter, ‘the optimal equalization’) in response to the change in the operating environment such as a temperature change. The optimal equalization is achieved as the voltage of each control signal of the temperature control circuit 45 changes in response to the temperature change, and the changed voltage is reflected in the operation of the amplifier 421. Further, some of the changed voltages of the control signals help to perform the optimal equalization by changing an input impedance value of the display driving chip, and this will be described below. It is preferable that the optimal equalization reflected in the automatic equalization is used during a vertical blank (V-Blank) section as shown in FIG. 5.

Figure 6:
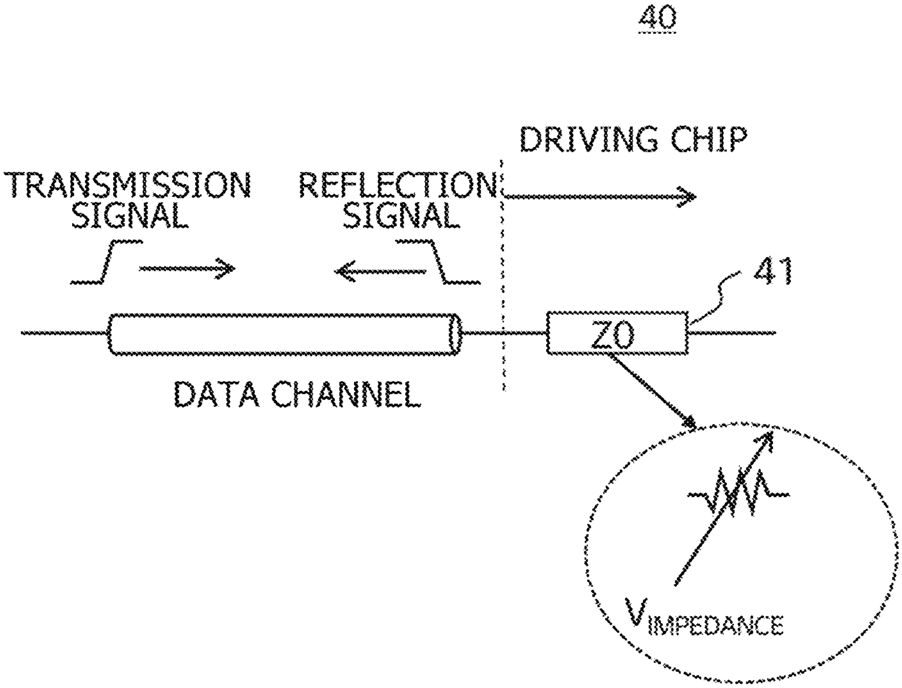
FIG. 6 is a view for describing an impedance matching circuit of the present invention.

FIG. 6 shows a view for describing an impedance matching circuit of the present invention.

In FIG. 6, the impedance matching circuit 41 is exemplified to describe the impedance controller 457 included in the temperature control circuit 45. As described above, a transmission signal passing through a long data channel reaches the display driving chip 40, and when the characteristic impedance of the data channel matches impedance ZO inside the chip, a reflection signal is minimized, and thus distortion of the transmission signal is reduced.

When the operating temperature of the chip changes, the impedance ZO of a resistor implemented in the circuit inside the chip changes. For example, when a resistor is manufactured using polysilicon, a well, or a diffusion area in a semiconductor manufacturing process, the impedance ZO of the corresponding resistor changes depending on the temperature coefficient of each material which implements the resistor. In order to compensate for this, an impedance control signal $V_{IMPEDANCE}$ generated from the impedance controller 457 is designed to have a value corresponding to the temperature change.

For example, the impedance controller 457 may increase the impedance control signal $V_{IMPEDANCE}$ by 10 mV each time the operating temperature increases by 10° C. from −15° C. The value of the input impedance 41 increased by the increased $V_{CTLE}$ voltage may be increased or decreased. In order to indicate the increase or decrease in impedance according to the increase in the impedance control signal, it is indicated as a variable resistor in FIG. 6 for convenience. Whether the variable resistance increases or decreases may change depending on whether an inherent temperature coefficient of the resistance is negative or positive (− or +). When the impedance ZO has a positive temperature coefficient, since this means that the resistance value increases as the temperature increases, the impedance control signal $V_{IMPEDANCE}$ operates to lower the variable resistance.

Throughout the specification of the present invention, a portion indicated as the variable resistor is only for the convenience of description, and it may be composed of a combination of several passive elements according to the embodiment, and the combination may also be variably switched according to the temperature to change the impedance value.

The temperature control circuit 45 may continuously change each of the control signals according to the change in temperature, and as in the above-described example, it is possible to assume several most probable temperatures in advance and then separately change each of the control signals according to the above.

As described above, the display driving chip according to the present invention may minimize a change in the operating characteristics of the display driving chip even when there are changes in the surrounding environment surrounding the display driving chip such as changes in the power voltage, the operating temperature, or the like. As a result, the display driving chip may transmit error-free image data to the display device, and ultimately maintain the image quality of the display screen at a constant level.

The present invention has been described using the display driving chip as an example, but may be applied to all types of display driving chips, and may be applied regardless of a type of display device such as a liquid crystal display (LCD) device, an organic light-emitting diode (OLED) device, or the like.

INDUSTRIAL APPLICABILITY

Since a display driving chip can exhibit constant performance despite a change in an ambient temperature of the display driving chip and a substrate on which the display driving chip is mounted, the present invention has industrial applicability and effectiveness in allowing the display driving chip to maintain the constant performance in the industry using the display driving chip.

The invention claimed is:

1. A display driving chip comprising:

an impedance matching circuit that matches characteristic impedance of a data channel and input impedance of the display driving chip;

an equalizer circuit that compensates for distortion of data input through the data channel;

a clock data recovery circuit that recovers an output of the equalizer circuit to match a clock signal;

a realignment circuit that converts the input data into serial data; and a temperature control circuit including a continuous time linear equalizer circuit (CTLE) controller for adjusting an equalizing condition of an internal amplifier of the equalizer circuit in response to a temperature sensing signal, a bias controller for adjusting a bias of the internal amplifier, and an impedance controller for adjusting impedance of the impedance matching circuit.

2. The display driving chip of claim 1, wherein the continuous time linear equalizer circuit controller further adjusts a gain of the amplifier.

3. The display driving chip of claim 1, wherein the bias controller variably adjusts the bias of the amplifier according to a temperature change.

4. The display driving chip of claim 1, wherein the impedance matching circuit is composed of passive elements or a combination thereof.

5. The display driving chip of claim 1, wherein the equalizer circuit performs one or more of initial equalization performed immediately after a power voltage is applied or a power-on reset (POR) signal is input, automatic equalization performed during a vertical blank section, and optimal equalization that optimizes the automatic equalization.

6. The display driving chip of claim 1, wherein the impedance controller is configured to variably control the input impedance of the display driving chip according to a temperature change.

7. The display driving chip of claim 1, wherein the impedance constituting the bias of the amplifier is composed of passive elements or a combination thereof.

8. The display driving chip of claim 1, wherein the control signals change by a constant voltage each time the operating temperature changes by 10° C.

9. The display driving chip of claim 8, wherein the constant voltage is 10 mV.

10. The display driving chip of claim 1, wherein voltages of the control signals continuously change as the operating temperature changes.

* * * * *